Jan. 17, 1950   J. W. GEDDES   2,494,996
RIVET CUTTER
Filed Dec. 11, 1944   2 Sheets-Sheet 1
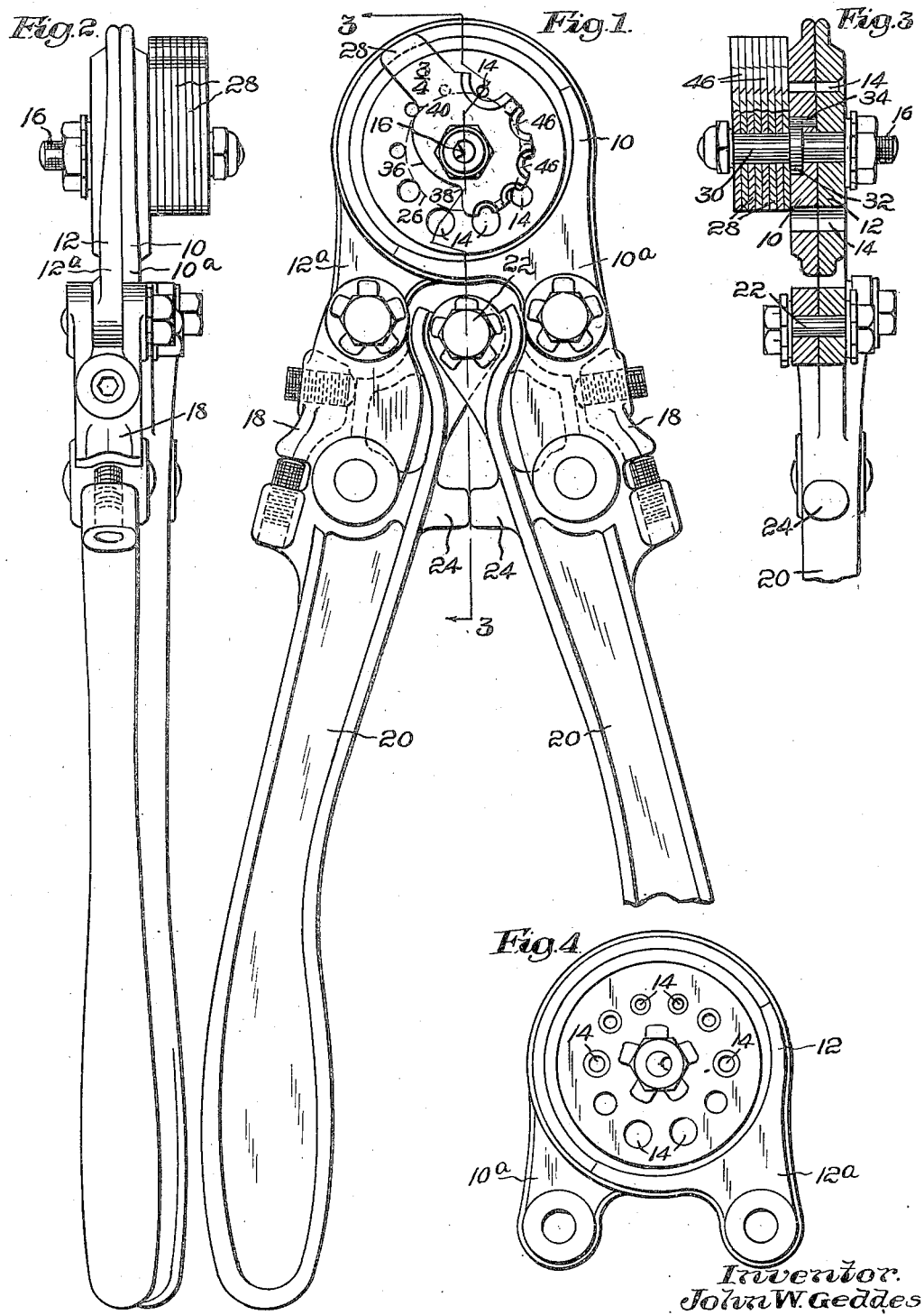
Inventor.
John W. Geddes Jan. 17, 1950     J. W. GEDDES     2,494,996
RIVET CUTTER
Filed Dec. 11, 1944     2 Sheets-Sheet 2
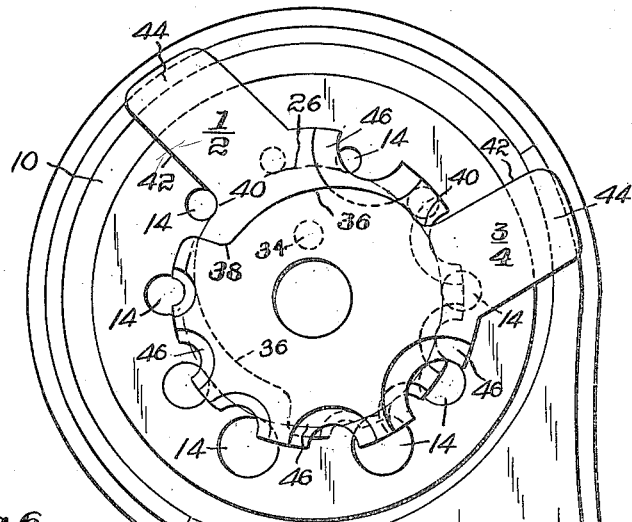
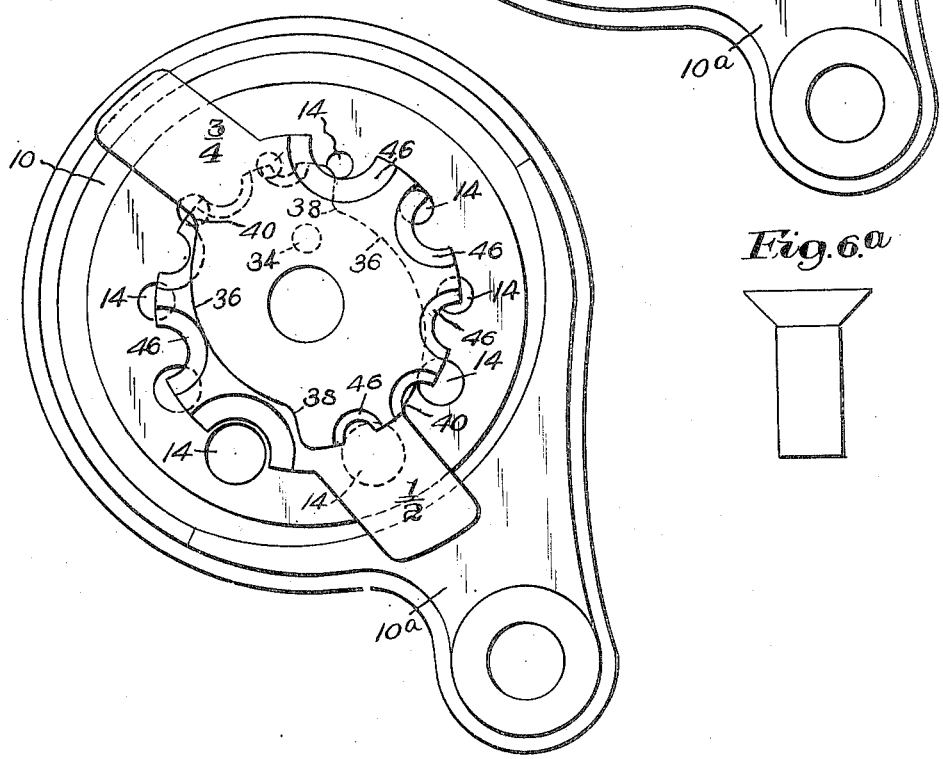
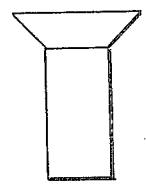
Inventor:
John W. Geddes,
by Emery, Booth, Townsend, Miller & Weidner
Attys.

Patented Jan. 17, 1950

2,494,996

UNITED STATES PATENT OFFICE 2,494,996

RIVET CUTTER

John W. Geddes, Boston, Mass., assignor to H. K. Porter, Inc., Everett, Mass., a corporation of Massachusetts Application December 11, 1944, Serial No. 567,767

8 Claims. (Cl. 30—226)

This invention relates to rivet cutters and the object is to provide a convenient and efficient tool for cutting rivets to predetermined lengths. Such tool has a particular utility in the manufacture and maintenance of airplanes.

My invention will be well understood by reference to the following description of an illustrative embodiment thereof shown by way of example in the accompanying drawings, wherein—

Fig. 1 is a plan of the tool with part broken away;

Fig. 2 is an edge view as seen from the left of Fig. 1;

Fig. 3 is a section on the line 3—3 of Fig. 1;

Fig. 4 is a plan view of the head of the tool as seen from the other side;

Fig. 5 is an enlarged view of one of the tool jaws showing the gage plates in position to cut a button-head rivet of relatively small diameter and of intermediate length;

Fig. 5a is a view of a button-head rivet such as is adapted to be cut by the tool in the position of adjustment shown in Fig. 5;

Fig. 6 is a view similar to Fig. 5 showing the gage plates adjusted to cut a flat-head rivet with relatively large sized shank and of intermediate length; and Fig. 6a is a view of a flat-head rivet such as is adapted to be cut by the tool in the position of adjustment shown in Fig. 6.

The tool shown by way of example in the drawings is adapted to cut a range of sizes of rivets, either of the flat-head type as shown in Fig. 6a or of the button-head type as shown in Fig. 5a, say, for example, of diameters from $3/32''$ to $6/32''$ by thirty-seconds and $1/4''$ and in lengths from $1/4''$ to $3/4''$ by sixteenths. These figures are exemplary. It will be understood that the length of a flat-head rivet is its over-all dimension, while a button-head rivet is measured under the head.

The tool herein shown is of the type comprising a pair of superposed relatively movable cutter plates or jaws 10 and 12 having one or more pairs of alignable openings 14 therethrough of suitable dimension to pass rivet shanks of standard sizes with suitable clearance sufficient merely to permit their ready insertion and removal. When a rivet is passed through a pair of aligned openings and the plates are moved to disalign them, the work is sheared at the meeting faces of the jaws. Rod cutters operating in this manner are well known.

In the example of the invention shown the jaws 10 and 12 are circular discs pivoted together by a central pivot bolt 16 and having respectively tail portions 10a and 12a connected through "adjusting sections" 18 to intermediate points on handle levers 20 pivoted together at 22. Adjusting sections such as those illustrated at 18 are well known in multiple lever tools and in use are rigidly related to the handles proper 20. Stops 24 are provided which limit the closing movement of the handles. In the closed position the openings 14 of the jaws are aligned for insertion of the work and by means of the adjusting sections the jaws may be adjusted to secure such alignment. The work is cut by a spreading movement of the handles.

To avoid confusion on the drawing the reference numeral 14 is used to indicate all the openings in the cutting jaws as the difference between them will be graphically apparent from the drawing itself. I have herein shown ten pairs of openings, two each of five different sizes, the two largest being approximately in the five and six o'clock positions, viewing Figs. 1 and 4, and intermediate sizes being in the four and eight o'clock positions, the three and nine o'clock positions and the two and ten o'clock positions, the smallest being in the one and eleven o'clock positions. The number and arrangement of the openings may be widely varied. The fact that two of each kind are here shown is due merely to the fact that room is available and two cutting mechanisms of each size are thus provided in a single tool. In the example shown the various openings 14 are disposed tangentially to a circle 26 indicated by the dot and dash line in Fig. 1 for a reason which will appear.

The jaw 12 may be of a fixed thickness, herein $1/4''$, and as seen in Figs. 4 and 3 at least certain of the openings, herein those of the three smaller sizes, may be countersunk to fit the under side of a flat-head rivet of the kind shown in Fig. 6a when its shank is passed into the openings from the side shown in Fig. 4. A rivet so inserted will be sheared off to a length corresponding to a thickness of the jaw 12. In the example shown the larger openings are not so countersunk since flat-head rivets of the larger sizes are not required of such a short length. The larger openings on this side would serve to shear a button-head rivet to a length of $1/4''$ under the head. Button-head rivets of the smaller sizes, if required so short, could be cut in a manner hereinafter described but are usually not required in practice.

Overlying the other jaw 10 is a stack of gage plates 28 pivotally mounted on an extension 30 of the pivot pin 16. In the example shown the jaw 10 may be considered to be $1/4''$ thick and the plates $1/16''$ thick to provide for cutting rivets in lengths from $1/4''$ to $3/4''$ by steps of one sixteenth. The pivot pin 16 conveniently has a shoulder 32 fitting a recess in the jaw 10 and locked against rotation relative thereto by the key or pin 34 (see Fig. 3). Thus in the operation of the tool we may consider the extension 30 of the pin and the jaw 10 as fixed and the turning motion to be concentrated in the jaw 12. Thus in operation there will be no tendency to disturb the adjustment of the various gage plates as hereinafter described.

I will now describe the construction of the gage plates, considering first their operation in connection with the cutting of a button-head rivet and referring particularly to Figs. 1 and 5. Each plate 28 is provided at one side with an edge portion 36 eccentric to the center of the tool and defining at one end thereof a portion 38 of reduced radius so that on turning of the plate it will always lie sufficiently far away from the several openings 14 to clear the head of any rivet which might be placed therein. The edge 36 extends to a point of greatest radius equal to that of the circle 26 and continues with such radius as a short edge portion 40, which will lie substantially tangent to the several openings. Extending substantially radially at the extremity of this portion 40 is the edge 42 of a tab 44 which extends outwardly, provides a manipulating handle for turning the various gage plates and also is adapted to receive dimensional markings, as indicated by the inscriptions ¾ and ½ in Figs. 5 and 6.

With all the plates in superposed alignment adjacent one of the openings 14, shown in Fig. 1 as the one which is in the ten o'clock position, the edge portions 40 and 42 will extend tangentially of the circle of the opening and are thus adapted to underride the head of a button-head rivet such as is shown in Fig. 5a, cradling it at two points about its circumference so that it is supported plumb in the openings with the under surface of the head ¾" away from the cutting plane. Such a rivet will thus be cut off to the length ¾" under the head.

If the stack of plates were moved from the position of Fig. 1, the edges could similarly cooperate with any other pair of openings. If it is desired to cut a shorter rivet, this may be done in the manner shown in Fig. 5 wherein the upper four gage plates have been swung by means of the tabs 44 so that the low points 38 are positioned adjacent the opening 14 in the ten o'clock position while the lower plates remain as before. The head of the rivet may thus pass down past the four upper plates which have been moved clockwise and will rest on the plate marked ½ in the figure and the rivet will be cut to ½" length. Assuming the tabs of the plates to be properly inscribed in steps of one-sixteenth, the uppermost tab adjacent the hole in use will indicate the length of rivet which will be cut.

While the rivet head is supported as described at two widely spaced points, a substantial arc of the head projects laterally conveniently exposed to be engaged by the fingers to remove the severed section for use.

I will next describe, with reference particularly to Fig. 6, the arrangement for cutting flat-head rivets, as shown in Fig. 6a, in various lengths. For this purpose the gage plates are provided with a series of radially opening notches 46 of different sizes having countersunk margins of a size to receive flush therein respectively the coned under sides of the heads of the different diameters of rivets, the dimensions of the parts being such that when one of these notches is adjusted in opposition to an opening 14 of corresponding size, as, for example, the notch in the plate marked ½ into cooperation with the opening in the seven o'clock position in Fig. 6, the outer margin of the coned recess will correspond to the outline of the head of a rivet centrally disposed in the opening. Otherwise expressed, the center of the notch will coincide with the center of the opening and we may say that the notch is aligned with the opening. If, however, the rivet head is over 1/16" deep, no part of the wall of the notch will extend to the wall of the opening. The notches extend through substantially a semi-circle as shown and underride and support the coned head of the rivet at two widely spaced points along its circumference to hold it plumb in the opening while leaving a considerable portion of the same exposed to permit the severed segment of the rivet to be easily picked up with the fingers. The operation will be clear from Fig. 6 where the parts are shown in position to cut a rivet ½" in over-all length by means of the opening at the seven o'clock position. For this purpose the four upper gage plates have been swung so that their low portions 38 are adjacent the opening in question while the four lower plates are moved so that the notch 46 of proper size is in alignment therewith. The length to which the rivet is to be cut is indicated by the legend on the tab exposed, in this instance in substantially the five o'clock position.

If the entire stack of gage plates is positioned with the low points 38 adjacent any one of the openings 14, the adjustment would permit a button-head rivet of the length corresponding to the thickness of the jaw 10 to be cut. If now we move any one of the gage plates, and preferably those underlying the same, from such inactive position so that the arc 40, in the case of a button-head rivet, or the notch 46 of proper size, in the case of a flat-head rivet, is presented adjacent such opening, we may cut respectively a button-head or a flat-head rivet, the length of which is determined by the position of the uppermost active gage plate and which size conveniently is inscribed on the tab 44 which forms a portion of the plate.

I am aware that the invention may be embodied in other specific forms without departing from the spirit or essential attributes thereof, and I therefore desire the present embodiment to be considered in all respects as illustrative and not restrictive, as in fact clear in several matters from the description itself. Reference is to be had to the appended claims to indicate those principles of the invention exemplified by the particular embodiment described and which I desire to secure by Letters Patent.

I claim:

1. A rivet cutter comprising a pair of relatively movable superposed jaws having alignable openings to pass a rivet shank, a stack of gage plates pivoted on one of the jaws, each plate having an edge portion substantially radial to the pivotal center and an adjacent edge portion substantially conforming to an arc about said center, said plate adapted to be adjusted to cause said edges to lie substantially tangentially to an opening at widely separated points about its circumference and each plate having also a portion of reduced radius which may be adjusted to lie adjacent such opening to provide a clearance space between such portion and the opening.

2. A rivet cutter comprising a pair of superposed pivoted discs having a series of pairs of alignable openings to pass rivet shanks of different sizes, the openings being substantially tangent at their inner sides to a circle centered at the pivotal axis of the disc, a stack of gage plates mounted to swing about said axis, each plate having an edge portion substantially radial to the pivotal center and an adjacent edge portion substantially conforming to an arc about said center, said plate adapted to be adjusted to cause said edges to lie substantially tangentially to an opening at widely separated points about its circumference and each plate having also a portion of reduced radius which may be adjusted to lie adjacent such opening to provide a clearance space between such portion and the opening.

3. A rivet cutter comprising a pair of relatively movable superposed jaws having a series of pairs of alignable openings to pass rivet shanks of different sizes, a stack of gage plates pivotally mounted on one jaw, each plate having a series of alignable superposed openings with walls adapted to fit the coned under surfaces of the heads of flat head rivets of different sizes to support them axially and position them in the plane of the plate, the plates being adapted to be adjusted into alignment with the corresponding opening and each having a portion of reduced radius which may be adjusted to lie adjacent such opening to provide a clearance space between such portion and the opening.

4. A rivet cutter comprising a pair of relatively movable superposed jaws having a series of pairs of alignable openings to pass rivet shanks of different sizes, a stack of selectively movabe gage plates mounted on one jaw, each having a similar series of alignable openings with walls adapted to fit the coned under surfaces of the heads of flat head rivets of different sizes to support them axially and position them with the upper surface of the head flush with the upper surface of the plate, the plates being capable of individual adjustment to align the openings therein with the corresponding openings in the jaws or to position them remote therefrom.

5. A rivet cutter comprising a pair of relatively movable superposed jaws having a series of pairs of alignable openings to pass rivet shanks of different sizes, a stack of selectively movable gage plates mounted on one jaw having each a similar series of alignable openings with walls adapted to fit the coned under surfaces of the heads of flat head rivets of different sizes to support them axially and position them with the upper surface of the head flush with the upper surface of the plate, the plates being capable of individual adjustment to align the openings with the openings of corresponding size in the jaws or to position them remote therefrom to provide a clearance adjacent such jaw openings to permit the head of a rivet inserted in the jaw opening to pass the plate and having homologous tab portions with dimensional markings thereon whereby adjustment of the plates is adapted to expose the markings of the uppermost plate in the first mentioned position.

6. A rivet cutter comprising a pair of relatively movable superposed jaws having a series of pairs of alignable openings to pass rivet shanks of different sizes, a stack of selectively movable gage plates mounted on one jaw having each a similar series of openings in the form of open-sided notches which fit the under sides of the heads of flat head rivets of said different sizes throughout an arc approaching a semi-circle, the plates being capable of individual adjustment to align the notches with the corresponding jaw openings or to position them remote therefrom.

7. A rivet cutter comprising a pair of superposed jaws pivoted together and having a series of pairs of alignable openings to pass rivet shanks, the pairs being of different sizes and the openings arranged substantially tangent to a circular arc about the pivot center, a stack of gage plates mounted on one jaw to swing individually about the pivotal axis and having eccentrically curved edge portions whereby they may be individually adjusted to present a portion spaced from or adjacent to the margin of a respective opening.

8. A rivet cutter comprising a pair of relatively movable jaws having a series of pairs of alignable openings therein to receive rivet shanks of different sizes, a stack of gage plates at the outer side of one jaw having portions adapted to underride and support the heads of flat head and button head rivets of corresponding sizes, the plates being individually adjustable to provide for positioning adjacent a selected opening the appropriate positioning portions of a desired number of the plates, at least certain of the openings at the outer side of the other jaw being countersunk to correspond to the head form of a flat head rivet of corresponding size.

JOHN W. GEDDES.

REFERENCES CITED

The following references are of record in the file of this patent:

UNITED STATES PATENTS

| Number | Name | Date |
| --- | --- | --- |
| 13,570 | Grover | Sept. 18, 1855 |
| 1,465,920 | Francis | Aug. 21, 1923 |
| 1,623,689 | Lind | Apr. 5, 1927 |
| 2,288,385 | Beard | June 30, 1942 |
| 2,391,637 | McEwen | Dec. 25, 1945 |